United States Patent [19]

Hodges et al.

[11] Patent Number: 4,631,631
[45] Date of Patent: Dec. 23, 1986

[54] CAPACITOR COVER AND TERMINAL CONNECTION

[75] Inventors: C. Wayne Hodges; Jozef K. Limanowski, both of Huntsville, Ala.

[73] Assignee: Emhart Industries, Inc., Indianapolis, Ind.

[21] Appl. No.: 783,690

[22] Filed: Oct. 3, 1985

[51] Int. Cl.⁴ .................. H01G 9/00; H01G 1/14; H05K 5/00
[52] U.S. Cl. .................... 361/306; 361/433; 174/18; 174/52 S
[58] Field of Search .................. 361/433, 306–310; 174/50, 52, 18, 52 S; 339/263 R, 263 E, 263 B, 263 L, 263 S; 429/178, 181, 183

[56] References Cited

U.S. PATENT DOCUMENTS 2,158,988 2/1937 Reetz .......................... 429/183 X
2,443,545 6/1948 Schwennesen .................. 361/433 X Primary Examiner—L. T. Hix
Assistant Examiner—Douglas S. Lee
Attorney, Agent, or Firm—Robert F. Meyer; Carl A. Forest

[57] ABSTRACT

An internally threaded insert having intersecting faces about its axis is positioned in a keyed aperture formed in a cover for a capacitor. This provides an antitwist characteristic between the insert and the walls of the aperture to facilitate a seal between the two. An electrical terminal can then be threaded into the insert to electrically connect it to an internal lead of the capacitor.

An elastic bushing is also carried in the keyed aperture to provide a seal.

The cover has a rib extending around its periphery to engage a capacitor housing, the rib providing a seal.

7 Claims, 2 Drawing Figures

CAPACITOR COVER AND TERMINAL CONNECTION

BACKGROUND OF THE INVENTION

Electrolytic capacitors commonly use plastic discs as the end closures or covers for the capacitor. Such material serves as a good electrical insulator for the electrical leads running from the capacitor. Electrical contact between an internal lead of the capacitor and an outside terminal is normally made through a rivet connection, the rivet extending through an aperture in the closing. This arrangement causes difficulty in securing a tight, secure fit between the rivet and the plastic closure. Such difficulty causes the electrical path between the terminal and the electrical leads to be broken down, thereby increasing the electrical resistance of the system.

OBJECTS OF FEATURES OF THE INVENTION

The present invention is concerned with the provision of a novel means to secure an electrical-mechanical connection for electrical leads to a plastic capacitor end closure or cover and has as one of its objects the provision of such a connecting means that has a more reliable connection.

Another object of the invention is to provide a good electrical connection between an electrical terminal and an internal lead of an electrolytic capacitor having a plastic end closure or cover.

SUMMARY OF THE INVENTION

Accordingly, there is provided a cover and terminal connection for a capacitor which comprises a disc fabricated of an electrically insulative material, at least one aperture in the disc, keying means in a first portion of the aperture, an elastic bushing fabricated of an electrically insulative material carried in a second portion of the aperture, a metal insert extending through the bushing and having an outer face adapted to engage the keying means to thereby provide an antitwist characteristic between the disc and the insert, receiving means within the insert adapted to receive an electrical terminal, and retaining means holding an internal electrical lead into electrical contact with the metal insert.

In addition, a rib extends from the cover to engage the capacitor for better sealing.

DETAILED DESCRIPTION OF THE INVENTION

Figure 2:
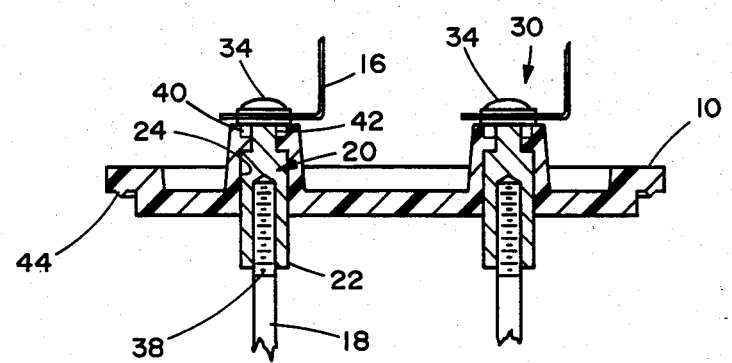
FIG. 2 is a view taken along the line 2—2 of FIG. 1 when all of the parts are assembled.
Figure 1:
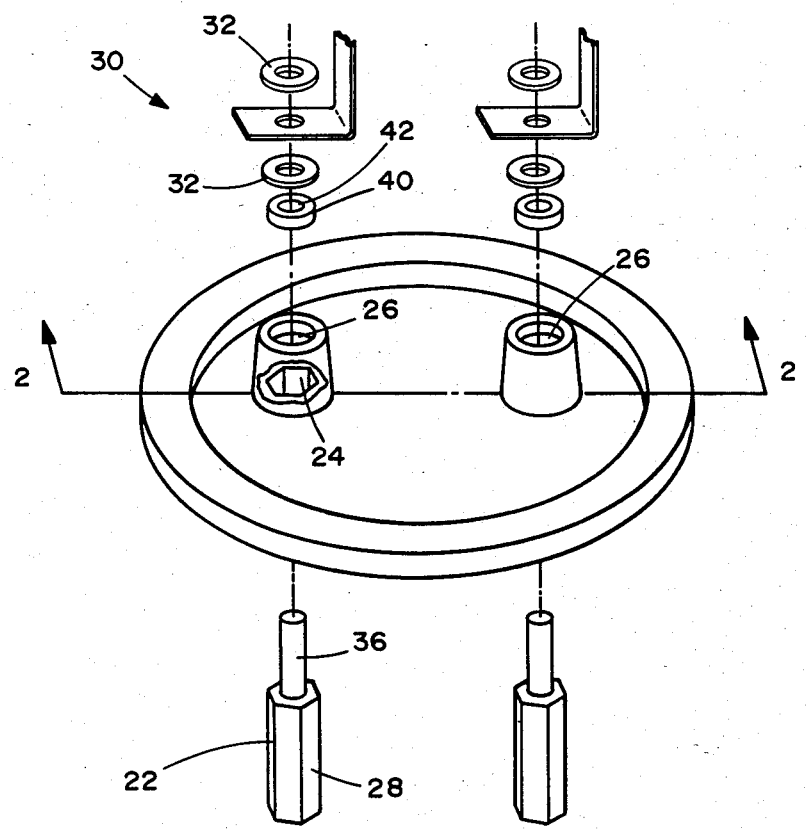
FIG. 1 is an exploded view of a terminal connection means for a capacitor showing the features of the invention.

Referring to the drawings, a typical prior art electrolytic capacitor employs an end closure or cover comprising a disc 10 fabricated of an electrically insulative material such as plastic to seal the capacitor body and to provide for a means for connecting suitable electrical terminals to the capacitor. With this type of construction, it is very difficult to achieve a good mechanical connection between the capacitor's internal electrical leads 16 and electrical terminals 18 due to the inability to achieve a snug fit in the aperture of the plastic cover 10. Such a fit is needed in order to insure that the electrical path from the internal lead 16 to the terminals 18 will be unbroken. Furthermore, a good seal needs to be maintained at the connection and between the cover and the housing for the capacitor body.

In accordance with the present invention, a terminal connection assembly includes a pair of apertures 26 provided in disc 10 which have keying means 20 and which in combination with the structure of metal inserts 22 provide an antitwisting characteristic between the disc and the insert. As shown, keying means 20 includes intersecting faces 24 which forms the walls of apertures 26 and which extend a portion of the way into the aperture. Inserts 22 include an outer face having substantially flat intersecting surfaces 28 which are adapted to mate the intersecting walls 24 of the apertures 26. In the present embodiment of the invention, the intersecting faces 24 and the intersecting surfaces 28 both provide a hexagon.

An elastic bushing 40 extends into the remaining portion of apertures 26 to provide a good seal for inserts 22. As shown, the inserts extend through bore 42 of the bushing. A suitable material for the bushing would be an electrically insulative material such as a thermal plastic or a thermal set material such as nylon.

There are also provided on the disc 10 a rib 44. Rib 44 extends around a periphery of the disc to provide a seal between the disc and a wall (not shown) of a housing for the capacitor body.

Inserts 22 are inserted in apertures 26 and internal electrical leads 16 are held in place on the inserts by retaining means 30 and provide good electrical contact between the inserts and the leads. Retaining means 30 includes washers 32 which are placed on both sides of the leads and rivet heads 34 which are formed from insert tenon 36. Inserts 22 also include a receiving means which includes internal threads 38 for receiving electrical terminals 18.

It can be readily seen that the terminal connecting assembly of the present invention provides an electrical connection between the terminals and the internal leads as well as a good seal between the inserts and the plastic disc, and the disc and a housing for the capacitor body.

What is claimed is:

1. A capacitor cover and terminal connection which comprises:
   a disc fabricated of an electrically insulative material, at least one aperture in said disc,
   keying means in a first portion of said aperture,
   an elastic bushing fabricated of an electrically insulative material carried in a second portion of said aperture,
   a metal insert extending through said bushing and having an outer face adapted to engage said keying means to thereby provide an antitwist characteristic between said disc and said insert,
   receiving means within said insert adapted to receive an electrical terminal, and
   retaining means holding an internal electrical lead into electrical contact with said metal insert.

2. A capacitor cover and terminal connection according to claim 1 wherein said elastic bushing is fabricated of a thermal plastic material or a thermal setting material.

3. A capacitor cover and terminal connection according to claim 1 wherein said keying means comprises flat intersecting walls of said aperture.

4. A capacitor cover and terminal connection according to claim 3 wherein said flat intersecting walls provide a hexagon.

5. A capacitor cover and terminal connection according to claim 1 wherein said receiving means includes internal threads.

6. A capacitor cover and terminal connection according to claim 1 wherein said retaining means includes a rivet head.

7. A capacitor cover and terminal connection according to claim 1 further including a rib extending from a periphery of said disc.

* * * * *